(12) United States Patent
Khan et al.

(10) Patent No.: US 10,277,558 B2
(45) Date of Patent: Apr. 30, 2019

(54) OVERLAY MANAGEMENT PROTOCOL FOR SECURE ROUTING BASED ON AN OVERLAY NETWORK

(71) Applicant: Cisco Technology, Inc., San Jose, CA (US)

(72) Inventors: Atif Khan, San Jose, CA (US); Syed Khalid Raza, Fremont, CA (US); Nehal Bhau, San Jose, CA (US); Himanshu H. Shah, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/677,001

(22) Filed: Aug. 14, 2017

(65) Prior Publication Data
US 2018/0109493 A1      Apr. 19, 2018

Related U.S. Application Data

(60) Division of application No. 15/261,790, filed on Sep. 9, 2016, now Pat. No. 9,736,113, which is a
(Continued)

(51) Int. Cl.
*H04L 29/06* (2006.01)
*H04L 12/751* (2013.01)
*H04L 12/715* (2013.01)
*H04L 12/701* (2013.01)
*H04L 12/28* (2006.01)

(52) U.S. Cl.
CPC .......... *H04L 63/0209* (2013.01); *H04L 45/00* (2013.01); *H04L 45/02* (2013.01); *H04L 45/64* (2013.01); *H04L 63/0272* (2013.01); *H04L 63/205* (2013.01); *H04L 12/2854* (2013.01); *H04L 63/166* (2013.01)

(58) Field of Classification Search
CPC ..... H04L 63/0209; H04L 45/02; H04L 45/64; H04L 63/0272; H04L 45/00; H04L 63/205; H04L 12/2854; H04L 63/166
See application file for complete search history.

(56) References Cited

U.S. PATENT DOCUMENTS 6,611,872 B1 * 8/2003 McCanne ........... H04L 12/1836
370/390
9,467,478 B1  10/2016 Khan et al.
(Continued)

*Primary Examiner* — Omar J Ghowrwal
(74) *Attorney, Agent, or Firm* — Polsinelli PC

(57) ABSTRACT

A method for creating a secure network is provided. The method comprises establishing an overlay domain to control routing between overlay edge routers based on an underlying transport network, wherein said establishing comprises running an overlay management protocol to exchange information within the overlay domain; in accordance with the overlay management protocol defining service routes that exist exclusively within the overlay domain wherein each overlay route includes information on at least service availability within the overlay domain; and selectively using the service routes to control routing between the overlay edge routers; wherein the said routing is through the underlying transport network in a manner in which said overlay routes is shared with the overlay edge routers but not with the underlying transport network via the overlay management protocol.

17 Claims, 9 Drawing Sheets

Related U.S. Application Data continuation of application No. 14/133,558, filed on Dec. 18, 2013, now Pat. No. 9,467,478.

(56) References Cited

U.S. PATENT DOCUMENTS

| | | | |
|---|---|---|---|
| 2004/0034702 A1 | 2/2004 | He | |
| 2006/0088031 A1 | 4/2006 | Nalawade | |
| 2006/0221830 A1 | 10/2006 | Hu | |
| 2007/0153782 A1* | 7/2007 | Fletcher | H04J 3/1617 370/389 |
| 2011/0075674 A1 | 3/2011 | Li et al. | |
| 2012/0092986 A1 | 4/2012 | Chen | |
| 2012/0180122 A1 | 7/2012 | Yan et al. | |
| 2013/0201909 A1 | 8/2013 | Bosch et al. | |
| 2014/0079059 A1* | 3/2014 | Amir | H04L 12/18 370/390 |
| 2015/0006737 A1* | 1/2015 | Chen | H04L 5/0044 709/226 |
| 2015/0103839 A1* | 4/2015 | Chandrashekhar | H04L 45/741 370/401 |

* cited by examiner

OVERLAY MANAGEMENT PROTOCOL FOR SECURE ROUTING BASED ON AN OVERLAY NETWORK

This application is a divisional of U.S. patent application Ser. No. 15/261,790, filed Sep. 9, 2016, which is a continuation of U.S. patent application Ser. No. 14/133,558, filed Dec. 18, 2013. The foregoing applications are incorporated herein by reference.

FIELD

Embodiments of the present invention relate to methods and systems for creating and operating secure wide area networks

BACKGROUND

Today, it remains a challenge for enterprises to build and control scalable secure private wide area networks (WANs) on-demand. This is partly due to the fact that significant network elements such as routers and circuits, being under the control of third parties such as cable providers and other service providers (SPs), are outside the control of said enterprises.

Moreover, from a control point of view, routing within such WANs is largely based on destination addresses alone and is controlled by said third parties. Thus, enterprises lack the ability to control routes within the prior art WANs.

SUMMARY

According to one aspect of the invention, there is a method for creating a secure network is provided. The method comprises establishing an overlay domain to control routing between overlay edge routers based on an underlying transport network, wherein said establishing comprises running an overlay management protocol to exchange information within the overlay domain; in accordance with the overlay management protocol defining service routes that exist exclusively within the overlay domain wherein each overlay route includes information on at least service availability within the overlay domain; and selectively using the service routes to control routing between the overlay edge routers; wherein the said routing is through the underlying transport network in a manner in which said overlay routes is shared with the overlay edge routers but not with the underlying transport network via the overlay management protocol.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention. Accommodate Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Glossary of Some Terms Used Herein
    WAN—Wide Area Network
    IP—Internet Protocol
    SP—Service Provider
    MPLS—Multiprotocol Label Switching.
    DTLS—Datagram Transport Layer Security
    IPSec—Internet Protocol Security
    OSPF—Open Shortest Path First
    BGP—Border Gateway Protocol
    AFI—Address Family Identifier
    SAFI—Subsequent Address Family Identifier
    NLRI—Network Layer Reachability Information
    VPN—Virtual Private Network
    IANA—Internet Assigned Numbers Authority
    NAT—Network Address Translation
    ICP—Interior Gateway Protocol
    TCP—Transmission Control Protocol Broadly, embodiments of the present invention disclose an overlay management protocol (OMP) that may be used to build scalable, dynamic, and secure networks, for example virtual private networks (VPNs), on-demand.

Figure 1:
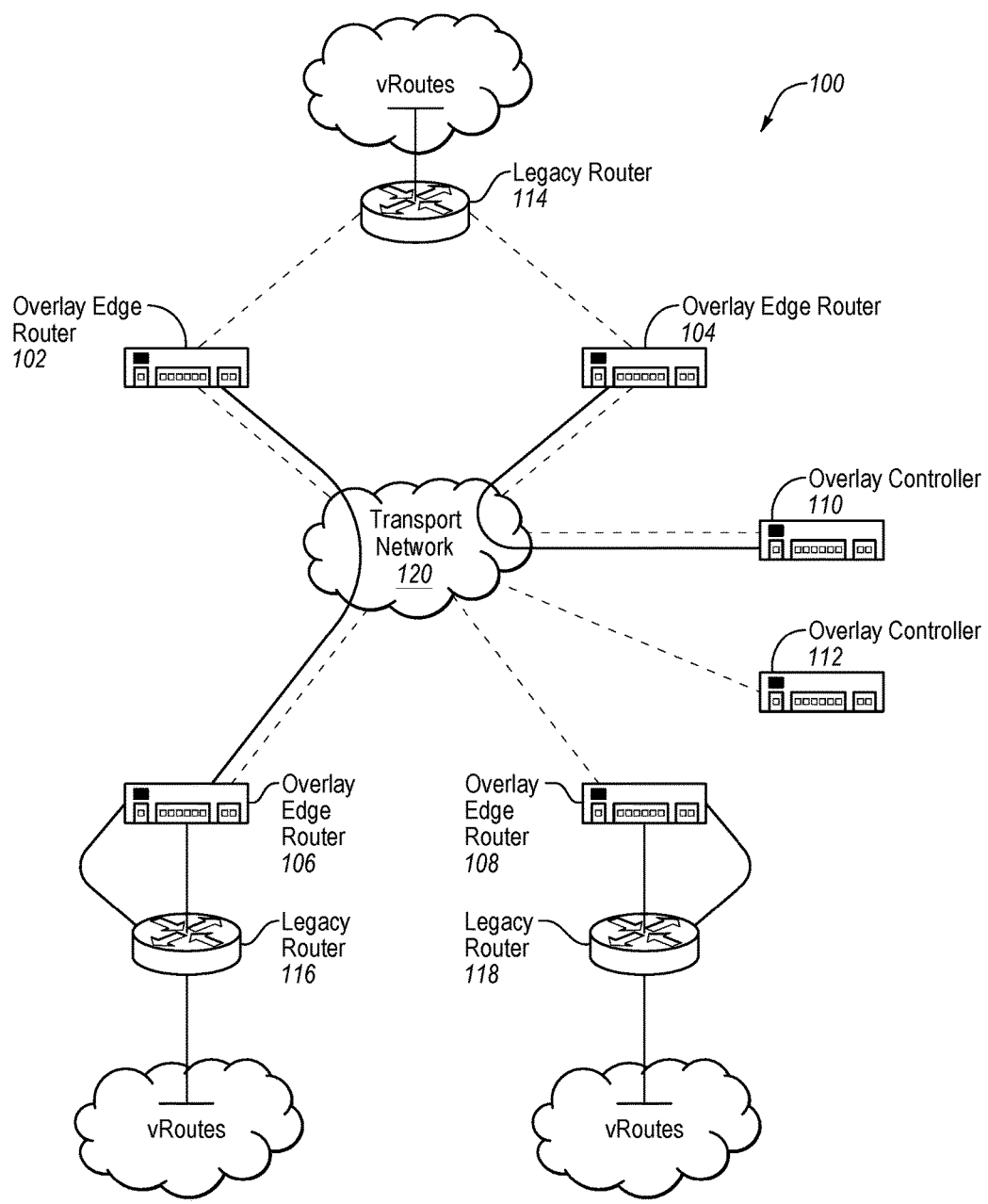
FIG. 1 illustrates an overlay domain (OD), in accordance with one embodiment of the invention.
Figure 2:
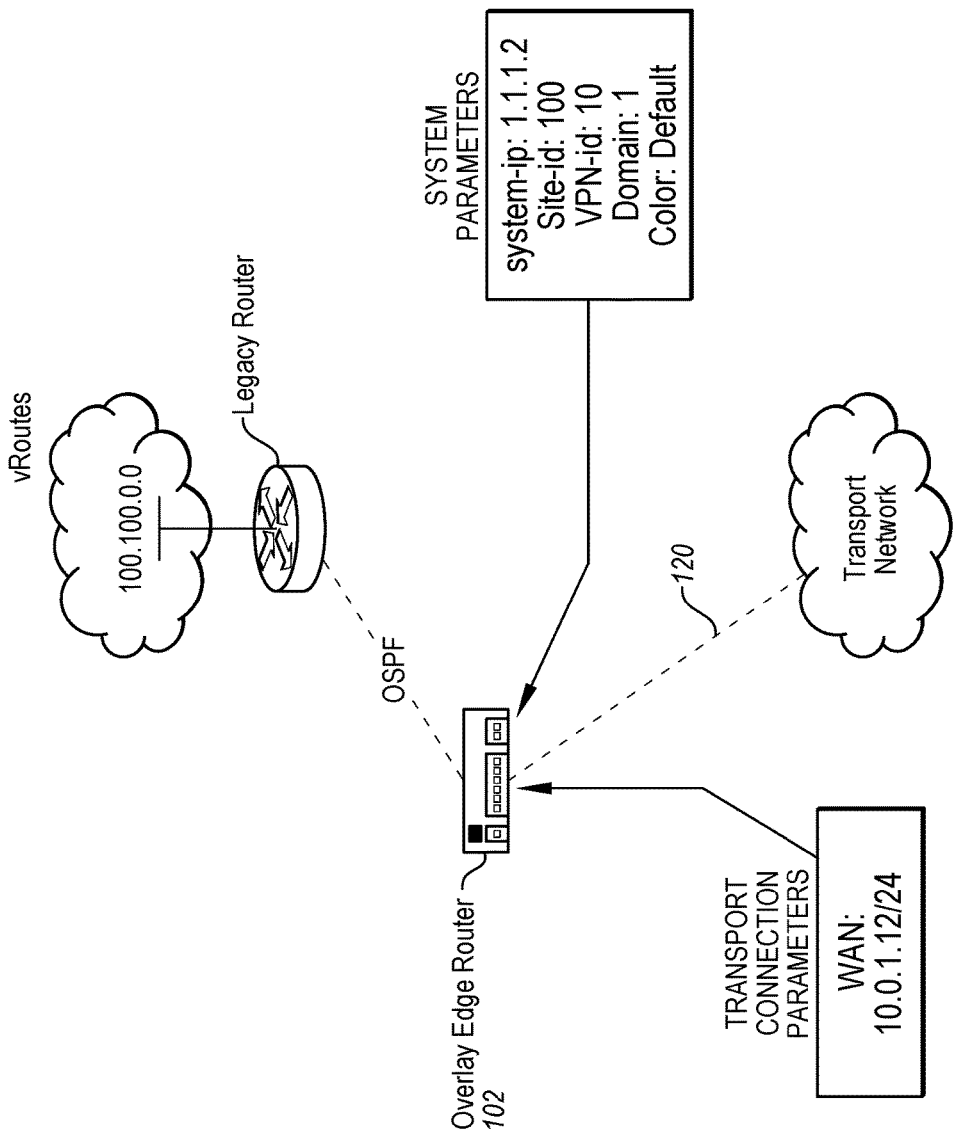
FIGS. 2-5 show portions of the overlay domain (OD), in greater detail.
Figure 3:
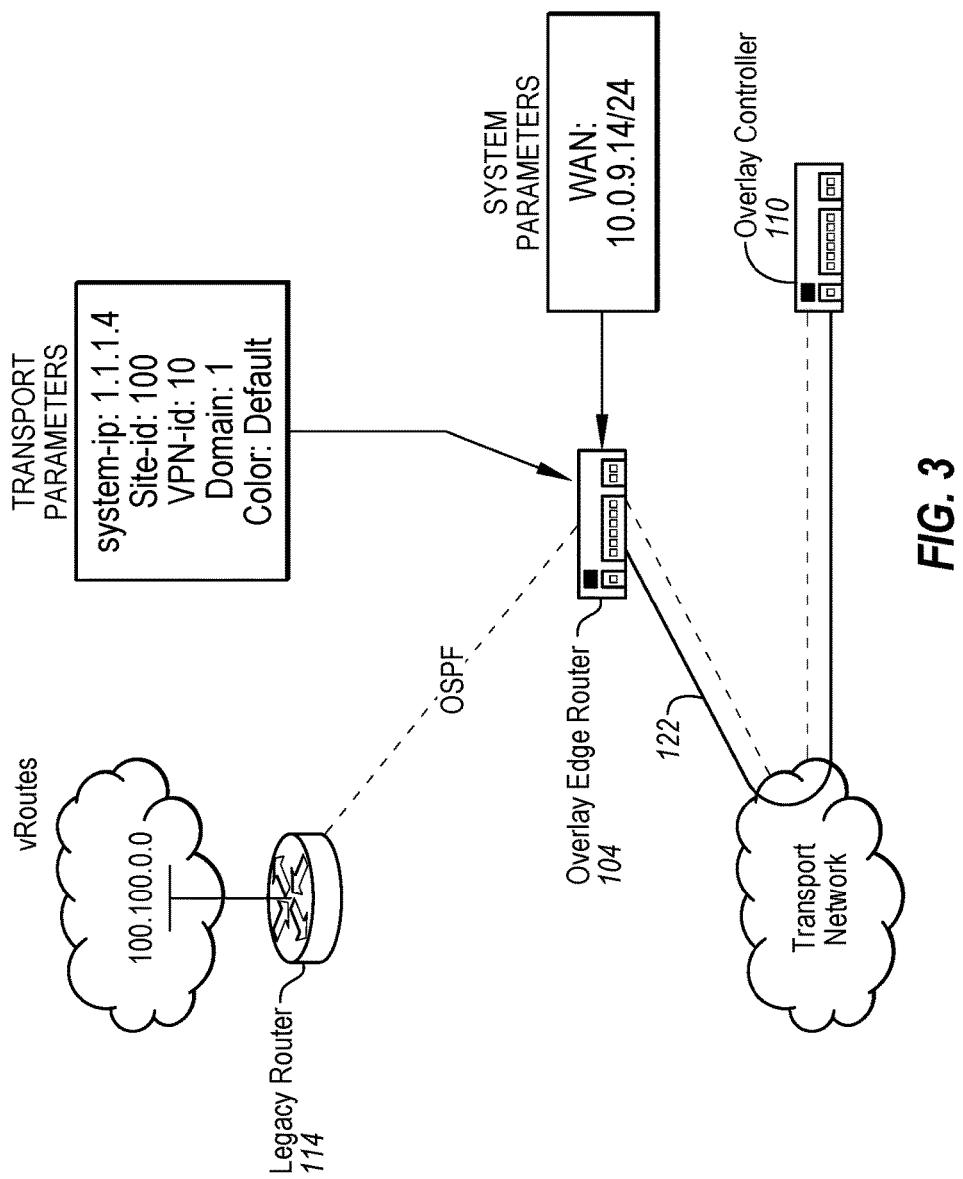
Figure 4:
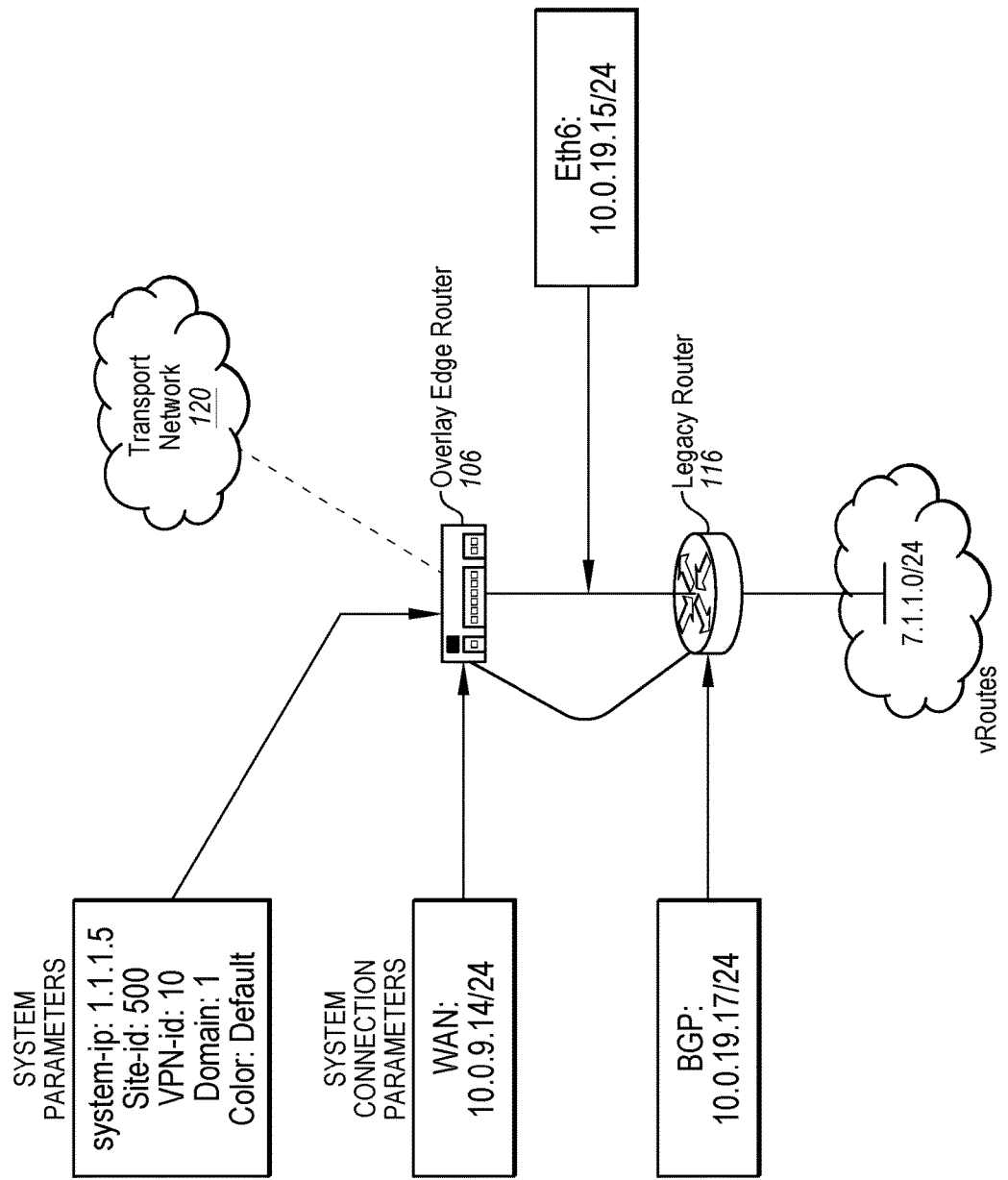
Figure 5:
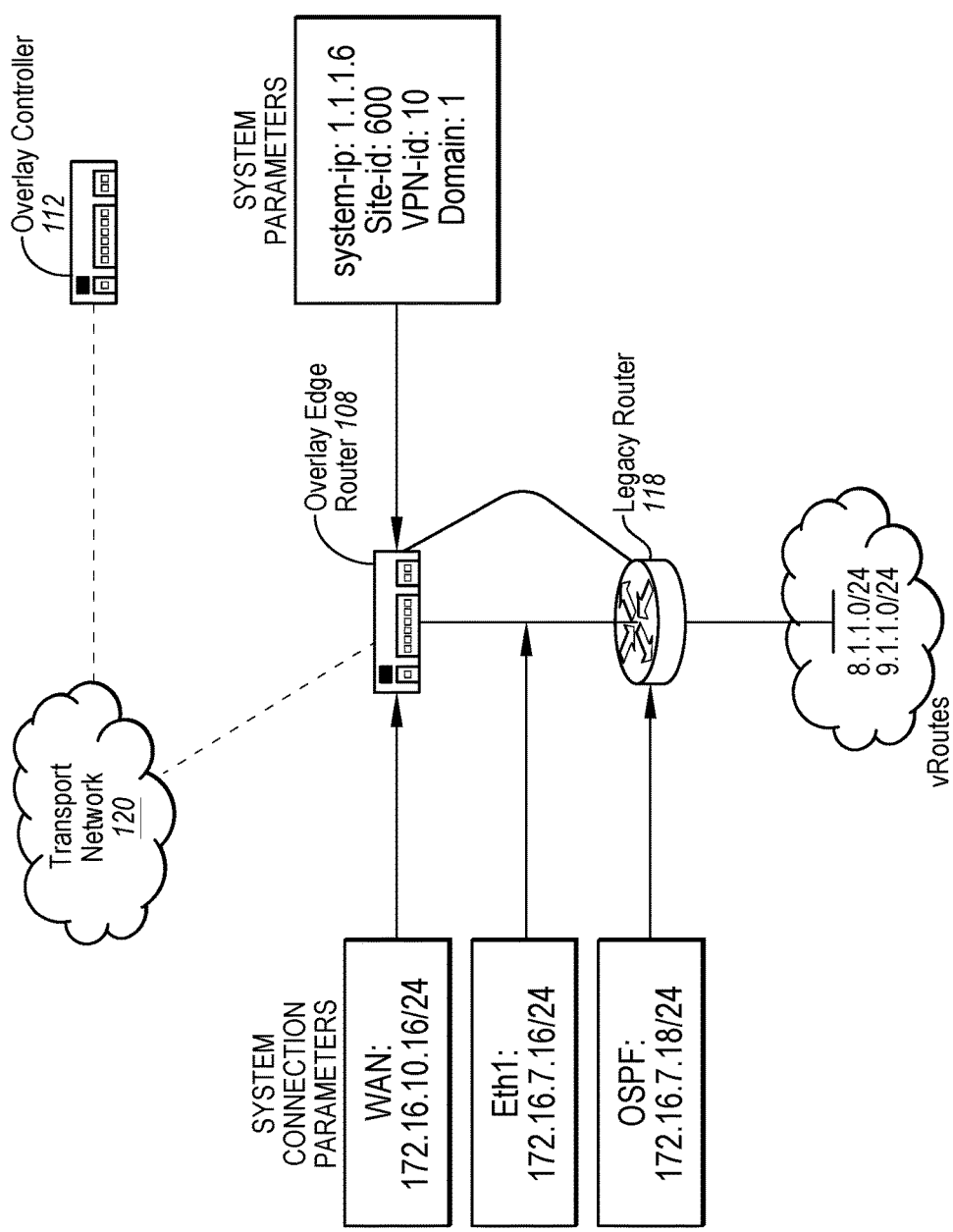

FIG. 1 shows a deployment scenario for embodiments of the invention. Referring to FIG. 1 an overlay domain (OD) 100 includes a plurality of overlay edge routers (OERs). In FIG. 1 only four overlay edge routers (OERs) are shown and are indicated by reference numerals 102, 104, 106, and 108, respectively. However, it is to be understood that the number four is arbitrary and that the overlay domain (OD) 100 may include more or less overlay edge routers (OERs).

The overlay edge routers (OERs) are located at the edge of the OD 100 and are within the control of an enterprise. As such, each overlay edge router (OER) is a customer premises (CP) device.

The overlay domain (OD) 100 further comprises at least one overlay controller (OC). In FIG. 1 two overlay controllers are shown and are indicated by reference numerals 110, and 112, respectively. As with the case of the number of the overlay edge routers (OERs), it is to be understood that the overlay domain (OD) 100 may include more or less overlay controllers than the illustrated number.

In one embodiment, each overlay edge router (OER) is capable of communicating with at least one legacy router (LR). For illustrative purposes, three legacy routers are shown in FIG. 1, where they are indicated by reference numerals 114, 116, and 118, respectively. In general, the term "legacy router" is used to refer to any router that is not within the overlay domain (OD) 100.

In use, the overlay domain (OD) 100 may rely on a transport network 120 to provide network transport functionality, as will be described later. The transport network 120 may include any wide area network (WAN) and in some embodiments may include the Internet, other public WAN, a Metro Ethernet or MPLS. Typically, the transport network 120 may include circuits and networks provided by third parties such as carriers, and service providers (SPs).

In one embodiment, each overlay edge router (OER) may be provisioned with transport parameters to allow connection to the transport network 120. Further, each overlay edge router (OER) may be provisioned with system parameters that include a site ID, a domain ID, a system ID, and an address for a mapping server. In one embodiment, the system ID may be a system-wide IP address.

Similarly, each overlay controller (OC) may be provisioned with transport parameters to allow connection to the transport network 120. Further, each overlay controller (OC) may be provisioned with system parameters similar to the system parameters of each overlay edge router (OER).

Exemplary values for the system and connection parameters are shown in FIGS. 2-5, which show portions of the overlay domain (OD) 100 in greater detail.

In one embodiment, each overlay edge router (OER) performs a bring-up procedure with an assigned overlay controller (OC) whereby the overlay edge router (OER) and said assigned overlay controller (OC) are first authenticated a mapping server and a secure communications channel (also referred to herein as a "control channel") is established between said overlay edge router (OER) and overlay controller (OC). Details of the bring up procedure, in accordance with one embodiment of the invention are provided in co-pending U.S. patent application Ser. No. 14/028,518, which is hereby incorporated herein by reference.

Referring to FIG. 1, reference numeral 122 shows an example of a control channel that was established as a DTLS tunnel between the overlay edge router (OER) 104 and the overlay controller (OC) 110 via the transport network 120 as a result of the bring up procedure. In one embodiment, the plurality of secure communications channels established between each overlay edge router (OER) and an assigned overlay controller (OC) together define an overlay control plane (OCP).

In one embodiment, secure tunnels may be established between one overlay edge router (OER) and another overlay edge router (OER). For example, reference numeral 124 shows a secure tunnel that may exist as an IPSec tunnel between the overlay edge router (OER) 102 and the overlay edge router (OER) 106. The tunnel 124 is through the transport network 120 and is used to transport data between its end points in a secure manner. The plurality of tunnels established between the various overlay edge routers (OERs) together form a secure overlay data plane (ODP).

In one embodiment, communications between an overlay edge router (OER) and an overlay controller (OC) may be facilitated by the use of the overlay protocol (OMP). The OMP may be used to exchange routing, policy, security, and management information between an overlay controller (OC) and an overlay edge router (OER).

In one embodiment, the OMP may be used to advertise routing information within the overlay domain (OD) 100, as will be described.

In one embodiment, the OMP uses TCP as its transport protocol. This eliminates the need to implement explicit update fragmentation, retransmission, acknowledgement, and sequencing. The OMP may listen on TCP port [17900, assigned through IANA].

The OMP may be configured to handle overlay routes and transport locators (TLOCs).

In one embodiment, an overlay route may include the prefixes that establish reachability between endpoints. An overlay route may represent services in a central data center, services at a branch office or collections of hosts and other endpoints in any location of the overlay network. An overlay route may require and resolve onto TLOCs for functional forwarding. In comparison with BGP, an overlay route may be considered to be the equivalent of a prefix carried in any of the BGP AFI/SAFI constructs.

In one embodiment, a transport locator (TLOC) ties an overlay route to a physical location. The TLOC is the only visible entity of the OMP routing domain to the underlying transport network 120, and is reachable via routing in the transport network 120. A TLOC can be directly reachable via an entry in the routing table of the physical network or be represented by a prefix residing on the outside of a NAT device, also present in the aforementioned routing table. The TLOC acts as the next-hop for overlay routes, to continue the BGP-analogy.

In one embodiment, an OMP speaker advertises to its peers, those overlay routes that it has learned locally from the site to which it is attached along with their location mappings. The OMP may interacts with traditional routing at the sites to which the overlay network extends and imports information from existing protocols, such as OSPF and/or BGP, providing reachability within a given site. The importing of routing information from the traditional protocols is subject to inherent, and potentially, user-defined policies.

Since the OMP operates in an overlay networking environment, the notion of routing peers is different from a traditional environment. From a logical point of view, the overlay environment consists of a central controller and a number of edge-devices. Each edge-device advertises the imported overlay routes to the central controller and the central controller, based on policy-decisions, further distribute the overlay routing information to other edge-devices in the network. Edge-devices are not configured to advertise routing information to each other using the OMP. The OMP-peering sessions between overlay controller (OC) and each overlay edge router (OER) are used exclusively for the exchange of control plane traffic, whereas the overlay data plane (ODP) channels are used for data traffic.

In one embodiment, each registered overlay edge router (OER) collects routes from directly connected networks, static routes, routes learned from the IGP protocols, and potentially BGP for redistribution.

The OMP may undertake path-selection, loop avoidance and policy execution on a local speaker basis to decide which overlay routes are installed in the local table of any edge-device. Inherent policies, best path selection and policy influencers are discussed in greater detail later.

In one embodiment, the OMP may support a variety of message types to enable routing control using the transport network 120. Examples of the message types a. HELLO message: This is a message that is sent periodically between peers in a peering session to indicate that each peer is alive and reachable;

b. HANDSHAKE message: This is the first message sent by each side after a TCP connection is established. In one embodiment, the handshake message may include the site-id of the site where the route originated. The site-id may be used for route selection and loop detection. The HANDSHAKE message may include a Hold Time, which is a value that is set by a overlay controller (OC) and specifies the time between HELLO messages and UPDATE messages between the overlay controller (OC) and a overlay edge router (OER).

c. ALERT message: This message is used by a peer on one end of a connection to notify the peer at the opposite end that an error condition has been detected.

d. UPDATE message: This is a type of message that is used to transfer routing information between peers in the overlay domain (OD) 100. An UPDATE message may be used to advertise feasible routes that share common path attributes to a peer, or to withdraw multiple unfeasible routes from service. An UPDATE message may simultaneously advertise a feasible route and withdraw multiple unfeasible routes from service.

e. QUERY message: This message is used to send a request for a specific route for which an aggregate or less specific rout exists. This message is sent by an edge-device once it finds out that a group of prefixes received is equipped with the Query attribute.

Overlay Routes

In one embodiment, the overlay routes may include the following types:

a. Connected (also called "direct");
b. Static;
c. OSPF (inter, intra, external); and
d. BGP.

Each overlay route may be advertised with the following attributes:

a. TLOC;
b. Site-ID;
c. Tag;
d. Preference;
e. Query;
f. Originator-ID; and
g. Origin.

Details of the attributes of an overlay route are provided later.

Transport Locations (TLOCS)

TLOCs (Transport locations) are the location ids, e.g. a WAN interface connecting into a carrier. TLOCs are denoted by {System-IP, Link-color} as described below.

The reason for not using an interface IP address to denote a TLOC is that IP addresses can move or change (e.g. if it is DHCP assigned). Using {system-IP, color} to denote TLOCs ensures that a transport endpoint can be identified irrespective of the interface IP addressing.

Each TLOC is advertised separately by the OMP. A TLOC may be advertised with the following attributes:

a) TLOC Private;
b) TLOC Public;
c) Weight;
d) Preference;
e) TAG;
f) Site ID;
g) Encapsulation type.

Details of the above attributes of a TLOC are provided later.

In one embodiment a TLOC may be represented by a system-id plus color where color represents the type of WAN interfaces on an overlay edge router (OER) A network operator may assign the color. In one embodiment, there may be predefined colors, e.g. default, biz-internet, public internet, metro-ethernet, MPLS, custom1, custom2, custom3, blue, bronze, gold, green, red, silver.

Service Routes

In one embodiment, service routes represent services connected to an overlay edge router (OER). The service routes may be advertised by the overlay edge routers (OERs) within the overlay domain (OD) 100 to the overlay controllers (OCs) using service address family Network Layer Reachability Information (NLRI).

In one embodiment the OMP may be configured to redistribute the following types of routes automatically it learns either locally or from its routing peers: connected, static, OSPF intra area routes, and OSPF inter area routes.

In one embodiment, redistribution of BGP and OSPF external routes may require explicit or manual configuration to avoid routing loops and suboptimal routing.

In one embodiment, the OMP may be used to set the origin type and sub-origin type of each overlay route to the route's origin. Examples of "origin" and "sub-origin" types are provided in the table below:

| Origin Protocol Type | Sub-Protocol Type |
| --- | --- |
| OSPF | Intra-area |
|  | Inter-area |
|  | External-1 |
|  | External-2 |
| BGP | internal |
|  | External |
| Connected |  |
| Static |  |

In one embodiment, the OMP may be used to carry the metric of the original route. Metric is '0' for connected routes.

In embodiment, an overlay edge router (OER) may implement a route selection procedure based on origin type and sub-type. An exemplary algorithm for the route selection procedure may be based on an "administrative distance" as follows:

An overlay route is an intra-site route if the receiving overlay edge router's site-id is the same as overlay route's site-id; otherwise it is an inter-site route;

Administrative Distance of an inter-site overlay route is 15;

Administrative Distance of an inter-site overlay route is 150;

Administrative distances of other protocols are:

| | |
|---|---|
| OSPF | 110 |
| iBGP | 200 |
| eBGP | 20 |
| Static | 1 |
| Connected | 0 |

Best Path Algorithm and Loop Avoidance

In one embodiment, an overlay edge router (OER) advertises its local routes to its assigned overlay controller (OC) using the OMP. Depending on the network topology, the same route may get advertised from multiple overlay edge routers (OERs).

The overlay controller (OC) my the choose the best route based on the following algorithm

```
a higher overlay route preference wins
    if equal then
    higher TLOC preference wins
    if equal then
        compare origin type
            { connected over static over EBGP over OSPF Intro over OSPF
inter over OSPF external over IBGP over unknown]
    if equal then
    lower metric wins
```

In one embodiment, an overlay route is only installed in the forwarding table of a overlay edge router (OER) if the TLOC it points to is active. In one embodiment, a TLOC is only active when there is an active BFD session with that TLOC. In one embodiment, if a BFD session to a given TLOC becomes inactive then all overlay routes pointing to that TLOC are removed from the forwarding table.

In one embodiment, each overlay edge router (OER) establishes a separate BFD session with each of the remote TLOCs. In another embodiment, a BFD session will only be established with TLOcs to which there is active traffic flow. Details of the Attributes of an Overlay Route:

TLOC:

A TLOC is similar to the NEXT HOP attribute in BGP and is carried in the overlay route NLRI with a type value of 1. The actual TLOC is not carried as an immediate attribute to the prefix, but rather the System-IP of the OMP speaker originating the overlay route. Carrying the System-IP allows for the mapping between overlay routes and TLOCs irrespectively of what the actual TLOC happens to be. This is important since TLOCs can change and will change when traversing NATs, something that OMP is designed to take into consideration. This TLOC attribute points the TLOC AFI/SAFI. Within the SAFI for each TLOC, the detailed information on each specific TLOC can be found. This includes detailed information on the actual next-hop address to use, the actual TLOC. This information includes the public IP address of the TLOC and if NAT is involved, the private and non-translated TLOC-address. This separation of information allows for individual advertisement and invalidation of overlay routes or TLOCs without having to invalidate the other dependent entity.

Site ID:

The Site ID is 4 bytes long and is used for identifying if the overlay route belongs a particular site regardless weather site is single or multi homed. Site-ID helps with selecting the routes, inter site routes are always preferred over IGP learned routes. IGP learned routes are preferred over intra site route. This helps in situation where there could be two site routers that are not servicing the same set of overlay edge routers (OERs).

Community/TAG:

This is a 4-octet path attribute that is optional and transitive. An OMP speaker may use this attribute to control the routing information it accepts, prefers or redistributes. For redistributed routes it could be used to control loops. Community could be attached, removed or modified from an update according to local policies.

Domain-ID:

This is 4 octet field, this attribute is attached by an overlay controller (OC) and is left empty in updates to peers in the same domain. Updates received from an overlay controller (OC) within a domain is not forwarded to other overlay controllers (OCs) in the same domain unless the overlay controller (OC) is considered higher in the overlay controller (OC) hierarchy. Any controller or group of controller can peer outside of their domain. When an overlay controller (OC) peers outside its domain it will attach its Domain-ID to any updates to guarantee a loop free topology. When a overlay route travels across domains, each overlay controller (OC) that regenerates the update into another domain must prepend its local Domain-ID, unless another controller in the originating domain has already prepended the local Domain-ID. If a receiving controller finds the local Domain-ID in the Domain LIST, the advertisement received SHOULD be ignored.

Preference (PREF):

is a well-known 4 octet attribute, that is included in all UPDATE messages that is either originated by an edge-device itself or part of policy setup at the controller. Any edge-device that receives an overlay route calculates the degree of preference for the route based on the configured policy before considering other attributes of a TLOC. A overlay route carrying a higher preference-value is preferred. Each overlay edge router (OER) may be configured to consider this attribute first in its decision process for route selection.

Query:

This is a one-octet attribute attached to an OMP update carrying an aggregated prefix. The attribute provides two applications; one from the controller's perspective and another from the edge-device perspective. From the controller perspective, when an aggregated shorter prefix is originated by the controller to any of the edge-devices this attributes indicates that specifics of the aggregated range exists and that they are located at location(s) different from that of the aggregate TLOC. In this case, the controller is indicating that a query for the TLOC where the longest match overlay route is located may be performed. From the edge-device perspective, using the advertised aggregate for data-plane traffic can take place in parallel to performing a query for more specific prefixes and the associated TLOCs.

Originator-ID:

This is a four-octet attribute that is mandatory and assigned by originator of a overlay route. The attribute carries the OMP Identifier of the originator of the route. Any controller passing the route should not alter the Originator-ID attribute.

Origin:

The Origin attribute is carried with each overlay route and is used to indicate which routing protocols were registered and/or redistributed by the OMP.

Details of the Attributes of a TLOC, in Accordance with One Embodiment.

TLOC Private:

This attribute has a value of 2 and is used to carry the actual address of an interface of an OMP speaker. This address may not be the address seen by the rest of the network if NAT is used in the path from the device to the transport network attachment. This is required for fully functional operation in a NAT environment.

TLOC Public:

This attribute has a value of 3 and is used to carry the address used on the outside of a NAT, corresponding to the address carried in the TLOC Private attribute for the network attachment on the inside of the NAT-device. For overlay route entries, this is the NAT translated address used to forward packets. This is not used as the next hop in the OMP, but only in the forwarding table, making the situation where TLOCs changing due to changing NAT mappings manageable and less disruptive.

Weight:

This is a four-octet unsigned number attribute with a value of 6. This attribute is used to discriminate among multiple entry points between caused by an overlay route being reachable through several different TLOCs. It is at the discretion of the operator to enable either EMCP or unequal cost multi-path traffic distribution based on the assigned weights.

Preference:

Similar to overlay rout-preference this is used to differentiate between the TLOCs advertising the same overlay route. Preference is a well-known attribute (value 5 is included in all UPDATE messages that are either originated by the edge-device itself or as part of a policy setup at the controller. Any edge-device receiving an overlay route takes the TLOC preference into consideration after considering the overlay route preference. A higher preference is preferred.

Color:

This is a four-octet attribute value used to define the characteristics of the link, define the service type or used it for COS based exit or entry into the TLOC. The color can be set by the edge-device or controller depending on the policy configured at either device, but needs to match across the network for efficient color-based forwarding to take place.

Community/Tag:

This is a four-octet entity, a path attribute that is optional and transitive. An OMP speaker may use this attribute to control routing information flow toward a TLOC. When an overlay route is advertised along with its TLOC, both or either can be distributed with a community TAG, to be used to decide how send or receive traffic from/to a group of TLOC's.

Site ID:

The Site ID is a four-octet attribute used for identifying overlay routes being sourced from particular sites. It assists in route-selection, since inter-site routes are always preferred over IGP learned routes.

Encapsulation:

The Tunnel Encapsulation attribute is an optional transitive attribute that is composed of a set of Type-Length-Value (TLV) encodings. The type code of the attribute is set to 4. Each TLV contains information corresponding to a particular tunnel technology.

Figure 6:
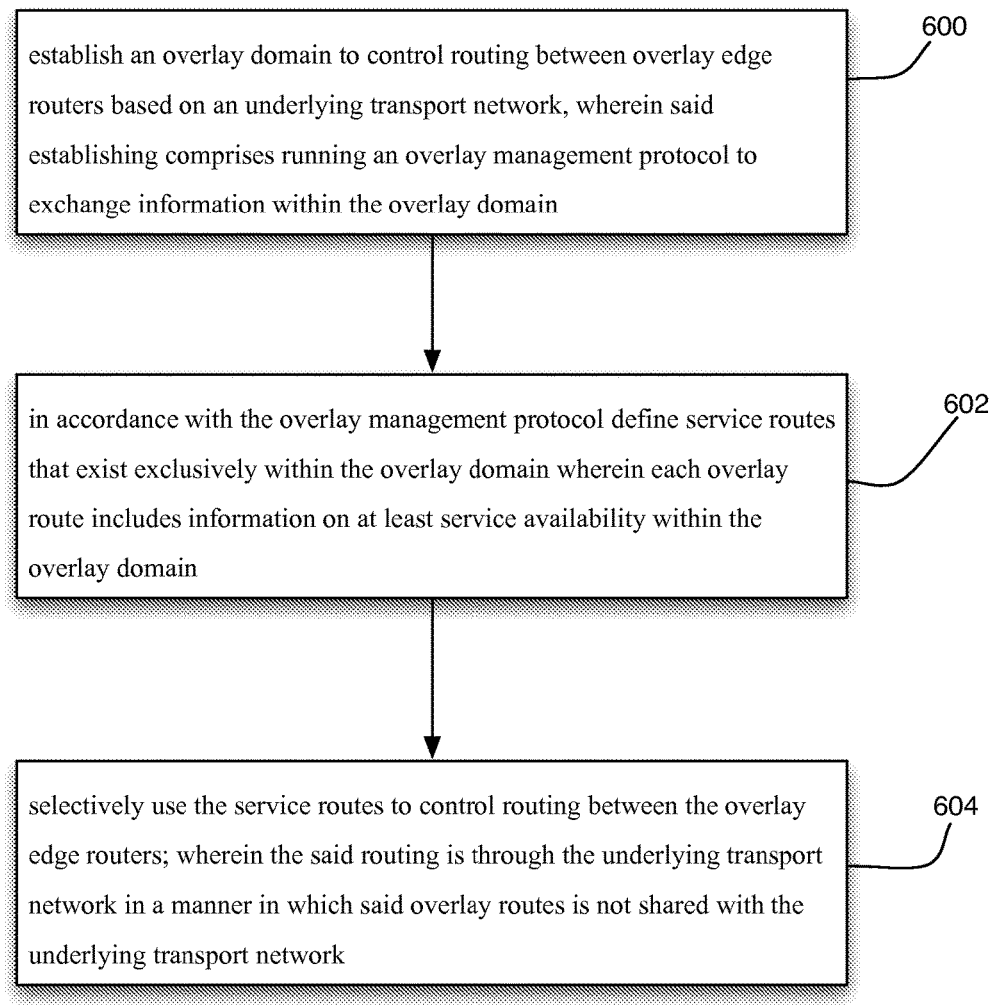
FIG. 6 shows a flowchart of a method for creating a secure network, in accordance with one embodiment.

In one embodiment the OMP may be used to create a secure network in accordance with a method illustrated in FIG. 6. Referring to FIG. 6, the method may include the following processing blocks:

Block 600: establish an overlay domain to control routing between overlay edge routers based on an underlying transport network. This step includes running the OMP to exchange information within the overlay domain;

Block 602: in accordance with the OMP define service routes that exist exclusively within the overlay domain wherein each overlay route includes information on at least service availability within the overlay domain; and Block 604: selectively use the service routes to control routing between the overlay edge routers; wherein the said routing is through the underlying transport network in a manner in which said overlay routes is not shared with the underlying transport network.

Figure 7:
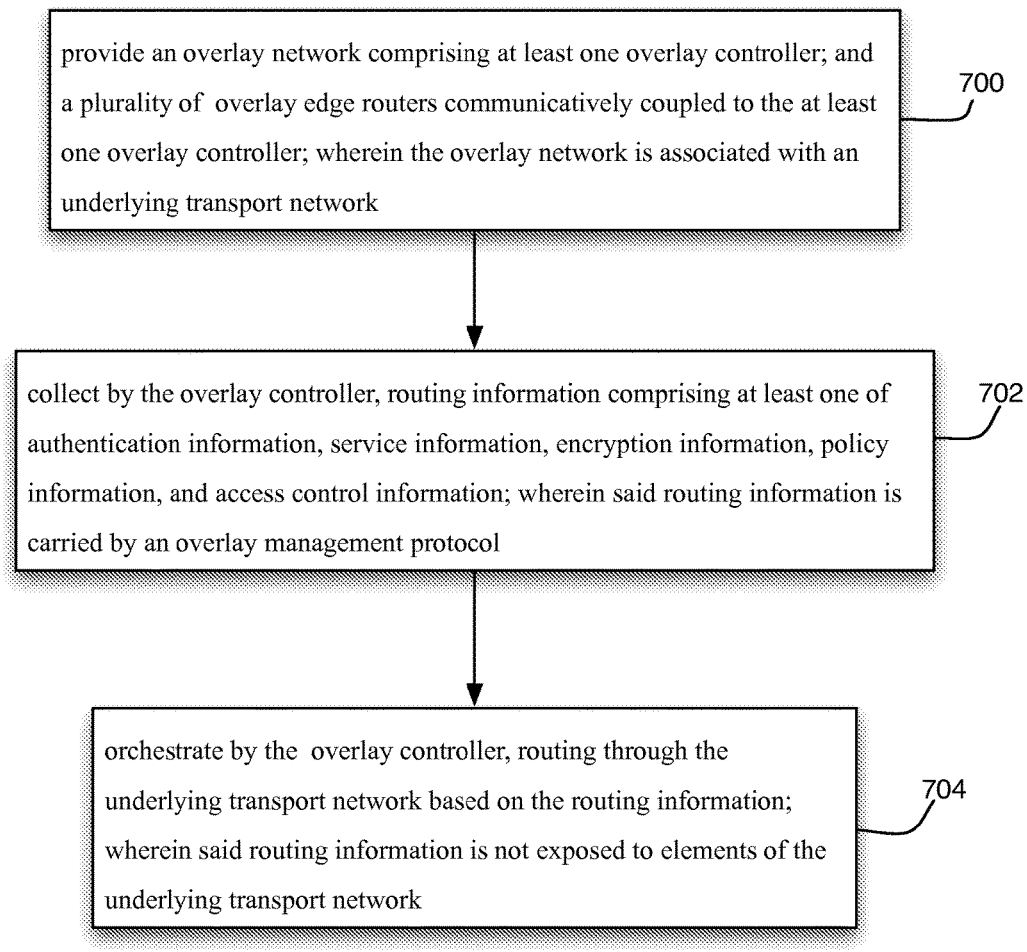
FIG. 7 shows a flowchart of a method for routing, in accordance with one embodiment.

In another embodiment, the OMP may be uses to perform a method for routing. This method is illustrated in the flowchart of FIG. 7. Referring to FIG. 7, the method may include the following processing blocks:

Block 700: provide an overlay network comprising at least one overlay controller; and a plurality of overlay edge routers communicatively coupled to the at least one overlay controller; wherein the overlay network is associated with an underlying transport network;

Block 702: collect by the overlay controller, routing information comprising at least one of authentication information, service information, encryption information, policy information, and access control information; wherein said routing information is carried by an overlay management protocol; and Block 704: orchestrate by the overlay controller, routing through the underlying transport network based on the routing information; wherein said routing information is not exposed to elements of the underlying transport network.

Figure 8:
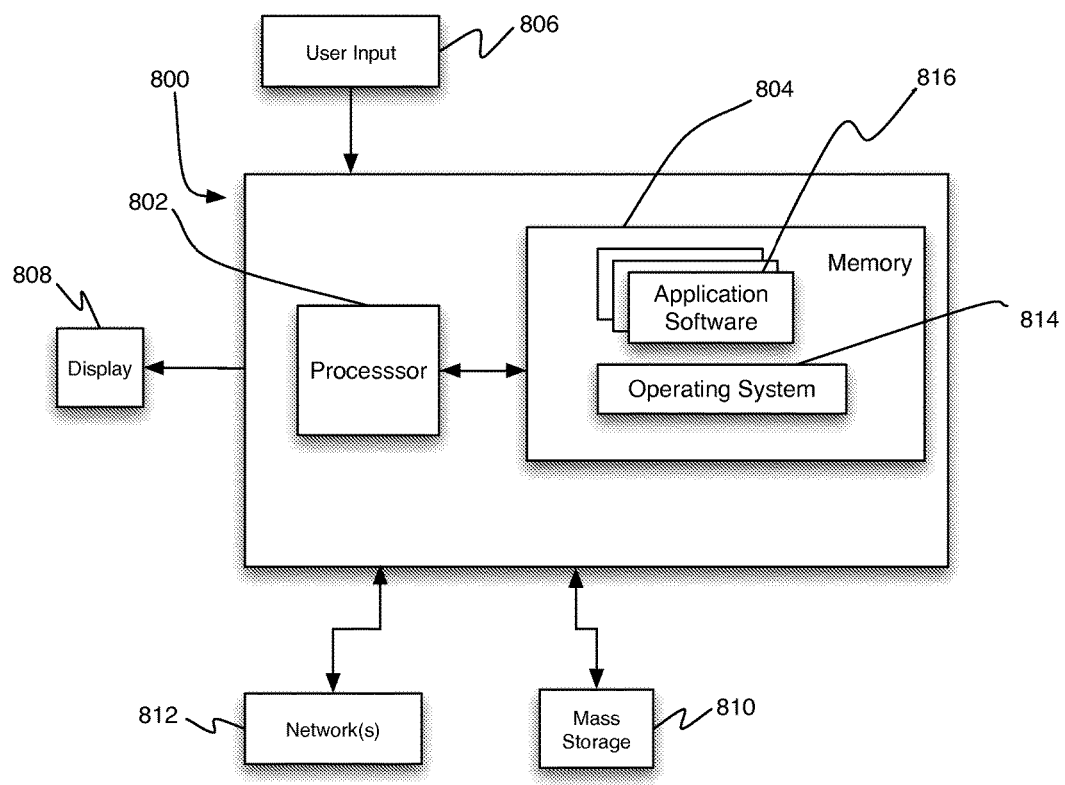
FIG. 8 shows a high-level block diagram for an overlay controller (OC), in accordance with one embodiment of the invention.

FIG. 8 shows an example of hardware 800 that may be used to implement the overlay controller (OC), in accordance with one embodiment. The hardware 800 may includes at least one processor 802 coupled to a memory 804. The processor 803 may represent one or more processors (e.g., microprocessors), and the memory 804 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 804 may be considered to include memory storage physically located elsewhere in the hardware, e.g. any cache memory in the processor 802, as well as any storage capacity used as a virtual memory, e.g., as stored on a mass storage device.

The hardware also typically receives a number of inputs and outputs for communicating information externally. For interface with a user or operator, the hardware may include one or more user input output devices 806 (e.g., a keyboard, mouse, etc.) and a display 808. For additional storage, the hardware 800 may also include one or more mass storage devices 810, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 812 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 812 and each of the components, as is well known in the art.

The hardware 800 operates under the control of an operating system 314, and executes application software 816 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 9:
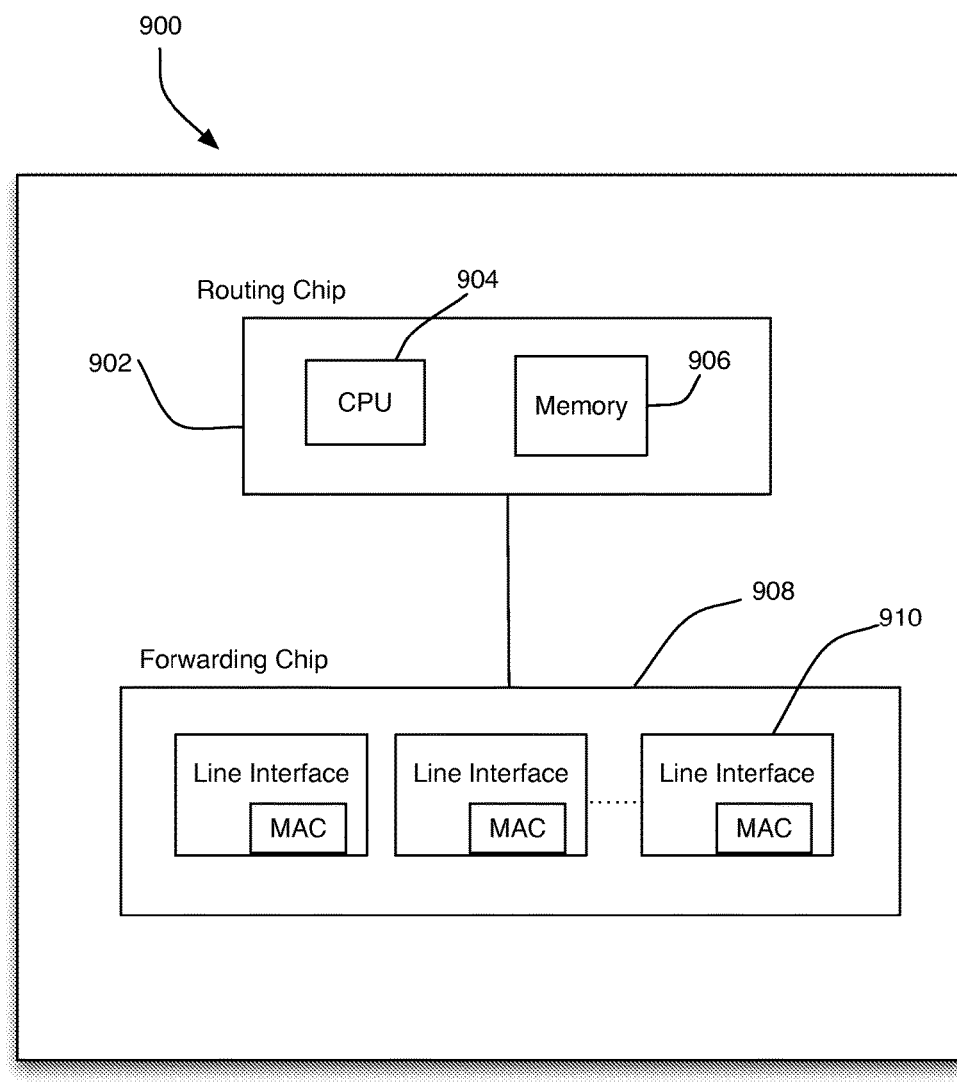
FIG. 9 shows a high-level block diagram of hardware for a router, in accordance with one embodiment of the invention

FIG. 9 shows a block diagram of hardware 900 for any of the routers disclosed herein, in accordance with one embodiment of the invention. Referring to FIG. 9, the hardware 900 includes a routing chip 904 coupled to a forwarding chip 908. The routing chip 904 performs functions such as path computations, routing table maintenance, and reachability propagation. Components of the routing chip include a CPU or processor 904, which is coupled to a memory 906. The memory stores instructions to perform the methods disclosed herein. The forwarding chip is responsible for packet forwarding along a plurality of line interfaces 910

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method comprising:
at an overlay network comprising an overlay controller and a plurality of overlay edge routers that are within control of an enterprise:
provisioning the overlay controller and the plurality of overlay edge routers with transport parameters to allow respective connections to a public transport network that is not within control of the enterprise;
establishing a secure overlay control plane that includes a plurality of secure control channels between the overlay controller and respective overlay edge routers of the plurality of overlay edge routers;
establishing a secure overlay data plane that includes a plurality of secure tunnels between at least some of the plurality of overlay edge routers, wherein the plurality of secure tunnels go through the public transport network;
collecting, by the overlay controller, routing information comprising at least one of authentication information, service information, encryption information, policy information, and access control information wherein the routing information is carried by an overlay management protocol; and
transmitting, by the overlay controller, the routing information to one or more of the plurality of overlay edge routers over the secure overlay control plane in order to mask the routing information from the public transport network.

2. The method of claim 1, wherein the provisioning comprises:
provisioning the overlay controller and the plurality of overlay edge routers with respective system parameters that include one or more of a site identifier (ID), a domain ID, a system ID and an address of a mapping server.

3. The method of claim 1, wherein each of the plurality of secure control channels includes a Datagram Transport Layer Security (DTLS) tunnel.

4. The method of claim 1, wherein each of the plurality of secure tunnels includes an Internet Protocol Security (IPSec) tunnel.

5. The method of claim 1, further comprising:
routing, based on the routing information, data traffic over the secure overlay data plane.

6. The method of claim 5, wherein the routing comprises:
routing the data traffic over the plurality of secure tunnels going through the public transport network.

7. A non-transitory computer-readable medium having stored instructions which when executed by a system cause the system to:
provision an overlay controller and a plurality of overlay edge routers that are within control of an enterprise with transport parameters to allow respective connections to a public transport network that is not within control of the enterprise;
establish a secure overlay control plane that includes a plurality of secure control channels between the overlay controller and respective overlay edge routers of the plurality of overlay edge routers;
establish a secure overlay data plane that includes a plurality of secure tunnels between at least some of the plurality of overlay edge routers, wherein the plurality of secure tunnels go through the public transport network;
collect, by the overlay controller, routing information comprising at least one of authentication information, service information, encryption information, policy information, and access control information wherein the routing information is carried by an overlay management protocol; and
transmit, by the overlay controller, the routing information to one or more of the plurality of overlay edge routers over the secure overlay control plane in order to mask the routing information from the public transport network.

8. The non-transitory computer-readable medium of claim 7, wherein the provisioning comprises:
provisioning the overlay controller and the plurality of overlay edge routers with respective system parameters that include one or more of a site identifier (ID), a domain ID, a system ID and an address of a mapping server.

9. The non-transitory computer-readable medium of claim 7, wherein each of the plurality of secure control channels includes a Datagram Transport Layer Security (DTLS) tunnel.

10. The non-transitory computer-readable medium of claim 7, wherein each of the plurality of secure tunnels includes an Internet Protocol Security (IPSec) tunnel.

11. The non-transitory computer-readable medium of claim 8, further comprising:
routing, based on the routing information, data traffic over the secure overlay data plane.

12. The non-transitory computer-readable medium of claim 11, wherein the routing comprises:
routing the data traffic over the plurality of secure tunnels going through the public transport network.

13. A controller, comprising: a processor; and
a memory coupled to the processor, the memory storing instructions which when executed by the processor causes the controller to:
provision an overlay controller and a plurality of overlay edge routers that are within control of an enterprise with transport parameters to allow respective connections to a public transport network that is not within control of the enterprise;
establish a secure overlay control plane that includes a plurality of secure control channels between the overlay controller and respective overlay edge routers of the plurality of overlay edge routers;
establish a secure overlay data plane that includes a plurality of secure tunnels between at least some of the plurality of overlay edge routers, wherein the plurality of secure tunnels go through the public transport network;
collect, by the overlay controller, routing information comprising at least one of authentication information, service information, encryption information, policy information, and access control information; wherein the routing information is carried by an overlay management protocol; and
transmit, by the overlay controller, the routing information to one or more of the plurality of overlay edge routers over the secure overlay control plane in order to mask the routing information from the public transport network.

14. The controller of claim 13, wherein the provisioning comprises:
provisioning the overlay controller and the plurality of overlay edge routers with respective system parameters that include one or more of a site identifier (ID), a domain ID, a system ID and an address of a mapping server.

15. The controller of claim 13, wherein each of the plurality of secure control channels includes a Datagram Transport Layer Security (DTLS) tunnel.

16. The controller of claim 13, wherein each of the plurality of secure tunnels includes an Internet Protocol Security (IPSec) tunnel.

17. The controller of claim 13, wherein the instructions further cause the controller to:
route, based on the routing information, data traffic over the secure overlay data plane.

\* \* \* \* \*